June 11, 1957  S. S. MINER  2,795,275
AUTOMATIC BLANK CUTTER
Filed May 7, 1952  6 Sheets-Sheet 2

INVENTOR.
SAMUEL S. MINER
BY
Charles C. Willson
ATTORNEY

June 11, 1957 S. S. MINER 2,795,275
AUTOMATIC BLANK CUTTER
Filed May 7, 1952 6 Sheets-Sheet 3

INVENTOR.
SAMUEL S. MINER
BY
Charles B. Willson
ATTORNEY

June 11, 1957 — S. S. MINER — 2,795,275
AUTOMATIC BLANK CUTTER
Filed May 7, 1952 — 6 Sheets-Sheet 5

INVENTOR.
SAMUEL S. MINER
BY Charles C. Wallson
ATTORNEY

United States Patent Office 2,795,275
Patented June 11, 1957

2,795,275

AUTOMATIC BLANK CUTTER

Samuel S. Miner, Mishawaka, Ind., assignor to United States Rubber Company, New York, N. Y., a corporation of New Jersey Application May 7, 1952, Serial No. 286,469

15 Claims. (Cl. 164—21)

This invention relates to a machine for cutting blanks from a continuously advancing limp web and in particular to a machine which is useful for cutting blanks from a web of unvulcanized rubber sheet stock as it comes off the calender.

Customarily these blanks are made by forming a continuous web of the material that is to constitute the blanks, and then conducting this web to a station where a suitably shaped die severs blanks from the web continually. One of the most common means for severing a blank from a web is a blanking press which severs a blank in basically the same manner that a cookie cutter severs a cookie from a mass of dough. The press has an anvil and a die head which carries a profile die having a sharpened edge projecting from the head toward the anvil. A web of the material to form the blank is led over the anvil, and when it is in place, the die head descends to drive the die through the web onto the anvil to sever a blank from the web.

In the rubber industry, the rubber floor mats for automobiles are commonly formed by conducting a web of limp unvulcanized rubber sheet stock from a calender to one of these blanking presses, where it is fed onto an endless belt which runs over the anvil. This belt first advances a portion of the web into position on the anvil, at which time the belt stops momentarily as the die head descends to sever a blank; after the blank is severed, the belt carries it away from the anvil and simultaneously conducts an uncut portion of the web to the anvil. This blanking press has many disadvantages when used to cut out blanks in this manner. If the blank is large, the press also must be large, and when the large die head descends on the anvil, it causes severe vibration of the foundation. This necessitates a heavy foundation for the press, and even with a heavy foundation, the continual jarring of the press is destructive, not only of the supporting structure, but also of the press itself and other equipment near the press. Furthermore, the die on each descent is driven into the belt which carries the web over the anvil, so that in a short time this belt is destroyed by the press.

It is the primary object of this invention to produce a machine adapted to cut blanks continually from a web of limp material which is less costly to make and to maintain than the machines, such as the blanking press which has been used heretofore.

This object is achieved by constructing a machine comprising a pair of spaced pressure rolls and a die and die carriage, which is adapted to handle a limp web and to cut blanks continuously from such a web. To cut the blanks, the rolls and die are arranged so that the die is advanced rapidly between the pressure rolls in conjunction with the web of limp stock to cut a blank. And to adapt the machine to cut blanks continuously from the limp stock, means are provided to immobilize one of the rolls and to hold the web of limp stock in position for a new cutting stroke against this roll while the die is being repositioned and the cut blank transported from the cutter.

Accordingly, further objects of this invention are to provide a blank cutter of this type having means to coordinate the advance of the die and the stock through the rolls, and to coordinate the operation of the cutter with the delivery of a web of limp stock to the cutter.

Still further objects are to provide a blank cutter of this type having means to reposition the die for a cutting stroke and to hold a continuously advancing limp web in position for a new cutting stroke while the die is being repositioned.

The machine contemplated by this invention comprises a resiliently surfaced pressure roll and a hard surfaced pressure roll spaced from each other and drivingly interconnected by a gear train. Rails mounted at each end of the rolls extend on either side of the nip of the rolls and carry a die carriage which reciprocates the die through the nip of the rolls. A rack is mounted along the length of both sides of the die carriage and meshes with a pinion on each end of the driving pressure roll to advance or retract the die as this roll is rotated. A pinch roll movable with the hard surfaced driven roll bears thereagainst and serves to hold the web in position against the driver roll.

To cut a blank from the web, the driving roll is rotated to advance the die through the nip of the rolls, and by means of the gear train, the driven roll and the web together with the pinch roll are moved in conjunction with the driving roll and the die. The rolls are then separated without disengaging the gears in the gear train connecting the drive and driven roll, and the rotation of the driving roll is reversed to retract the die. To prevent the web from being ejected from the machine when the die is retracted, the driven roll and the web are rendered motionless by means of a one way clutch and brake in the gear train between the driving and driven roll. The pinch roll is also braked. When the die has been retracted, the pressure rolls are repositioned and a new cycle is initiated.

For a better understanding of the nature of this invention and the means by which its many advantages are achieved, reference should be had to the following description when read in conjunction with the accompanying drawings; wherein.

Figure 1:
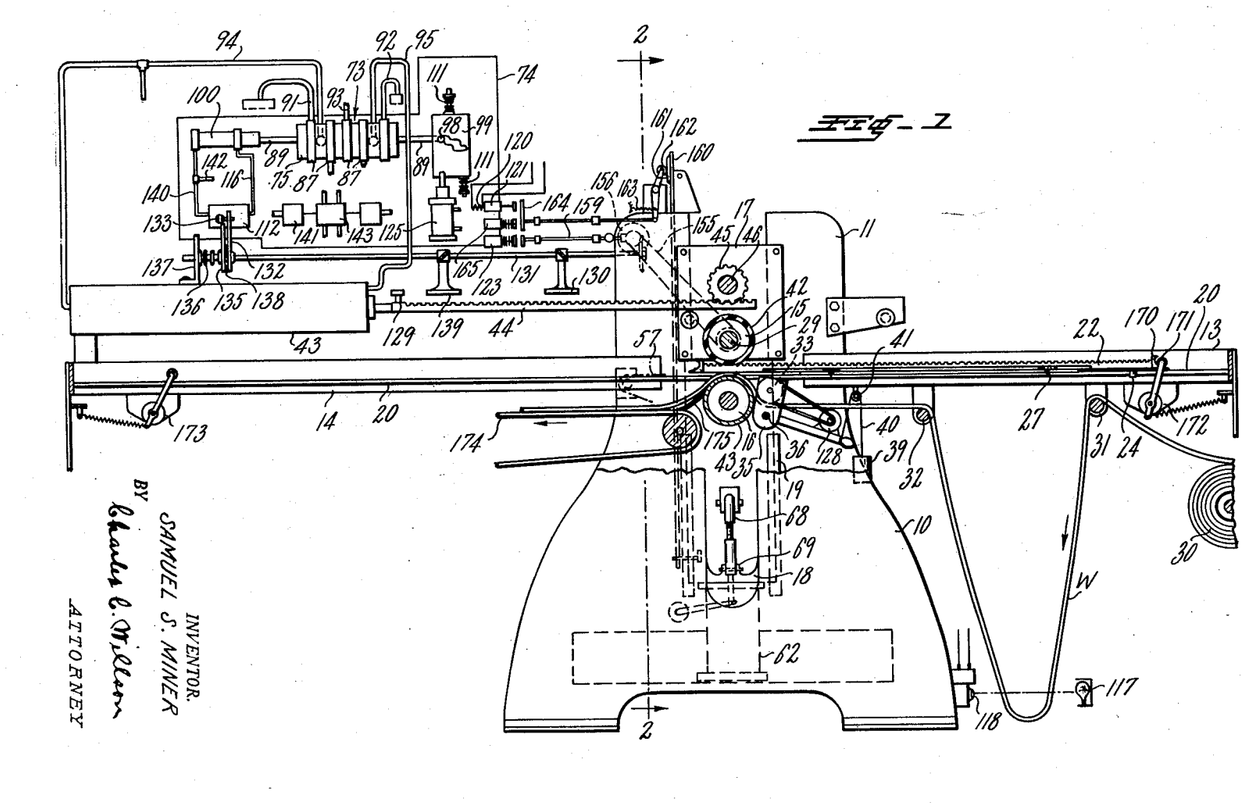
Fig. 1 is a side view of a blank cutter according to this invention having a portion of the side frame broken away and showing particularly the disposition of some of the controls and the web and die carriage between the pressure rolls.
Figure 2:
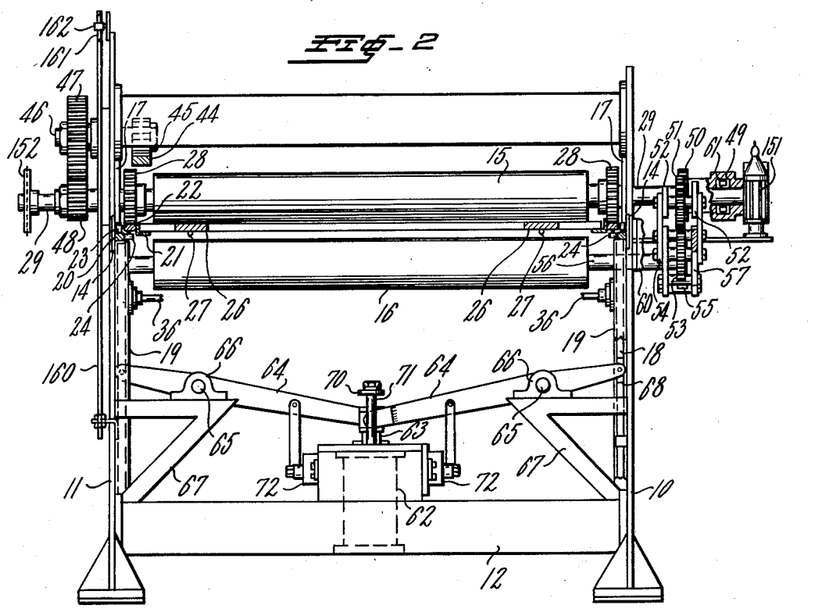
Fig. 2 is a view substantially along the line 2—2 of Fig. 1 having parts of the machine broken away for clarity of illustration.

Referring now to the drawings and to Figs. 1 and 2 in particular, there is shown a blank cutter embodying this invention comprising a pair of spaced side frames 10 and 11 connected by the bracing cross beams 12, the carriage end frames 13 and 14, and the driving and driven pressure rolls 15 and 16 respectively. The side frames 10 and 11 are bifurcated at their upper ends to facilitate insertion and removal of the pressure rolls and to permit the vertical movement of the driven pressure roll which occurs during the operation of the blank cutter. The upper or driving pressure roll 15 which has a resilient covering 42 is fixedly mounted in the bifurcated side frames on a shaft 29 journaled in the side plates 17 that are secured to the side frames. The lower or driven pressure roll 16 which has a hard surface against which the work is cut, is mounted on the shaft 56 journaled in the side lift plates 18 which are reciprocable in guideways 19 to raise the lower pressure roll to the cutting position shown in Figs. 1 and 2, or to lower it to the retracting position.

Figure 3:
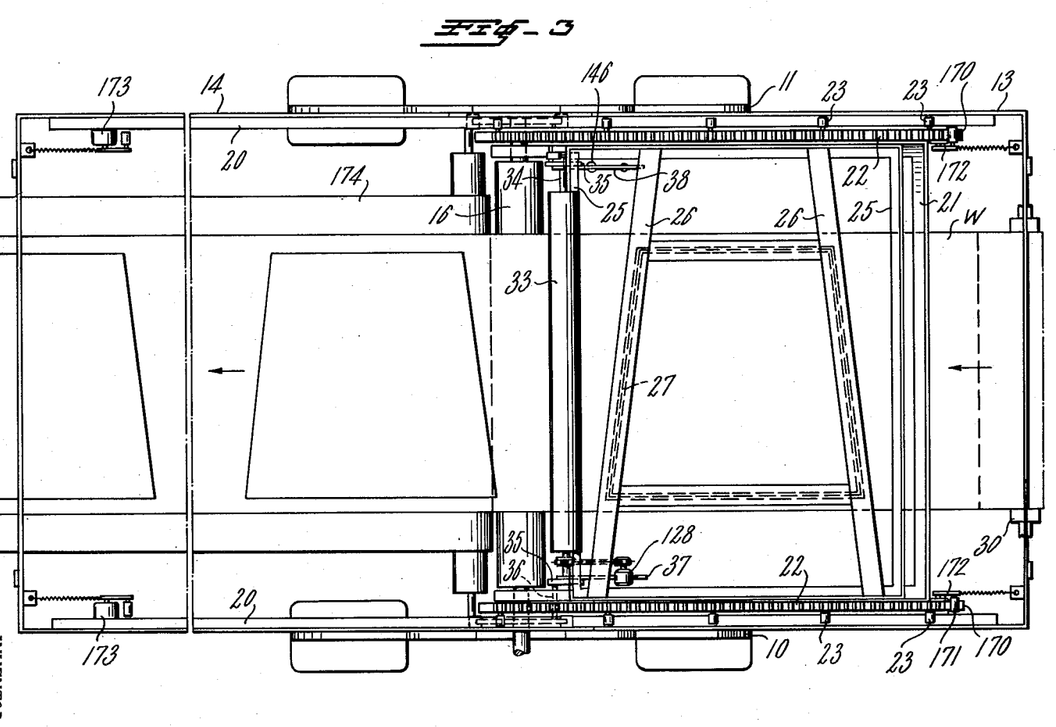
Fig. 3 is a plan view of the lower pressure roll, associated pinch roll, die carriage and the supporting structure therefor.
Figures 4, 5, 9, 10, 11:
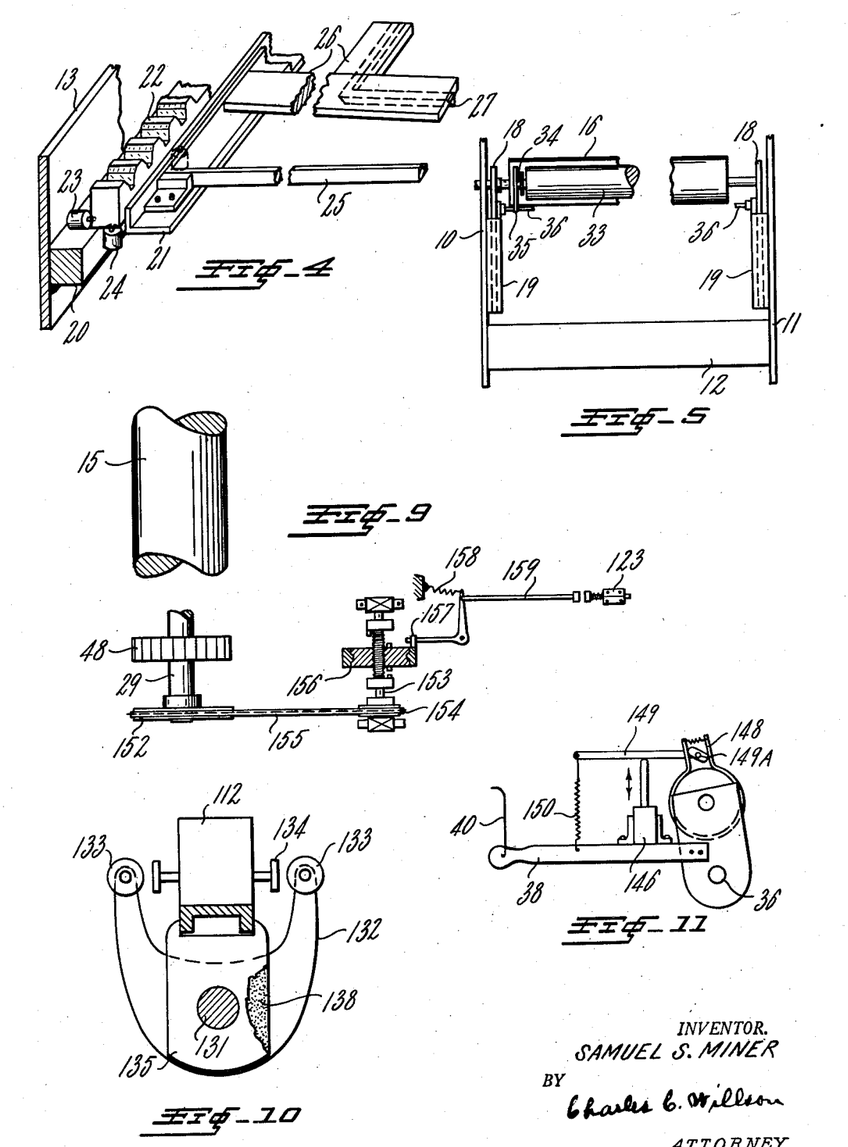
Fig. 4 is a perspective view of a portion of the die, die carriage and racks by which the die carriage is advanced through the nip of the pressure roll.
Fig. 5 is a side elevation of the driven pressure roll and the associated pinch roll showing the manner in which these elements are mounted on the side frames of the machine.
Fig. 9 is a plan view of the flywheel control which controls the reversal of the direction of travel of the die carriage of the blank cutter.
Fig. 10 is an end view of the valve which controls the length of cutting stroke of the die, and of a portion of the mechanism which actuates this valve.
Fig. 11 is a side view of the mechanism for braking the pinch roll of the blank cutter.

Die carriage rails 20 are fixed on the carriage frames 13 and 14 at each end of the pressure rolls and extend from one end of the cutter to the other in a position to carry the die through the nip of the rolls when the cutter is actuated. As best shown in Figs. 3 and 4, a rectangular die carriage 21 having a rack 22 fixed to each side thereof is mounted on the rails 20 by means of a plurality of spaced horizontal and vertical rollers 23 and 24 respectively fixed to the rack. The die carriage is adapted to receive an interchangeable die frame 25 which carries a die holder 26 having a profile die 27 projecting downwardly from the die frame. In the embodiment of the invention shown in the drawings, the die is depicted as an auto floor mat die comprising a thin strip of steel bent in the shape of an auto mat and fixed in a quadrilateral wooden die holder.

The racks 22 are of such a length as to be in continuous mesh with a pair of gears 28 fixed to the driving pressure roll shaft 29, and will be moved to advance or retract the die and die carriage through the rolls when the driving pressure roll, hence the gears 28, is rotated. As shown in Figs. 1 and 2, the driving and driven pressure rolls 15 and 16 are constructed and positioned relative to the die carriage 21 such that during a cutting stroke the lower pressure roll will press the web against the die to sever a blank. Since the upper pressure roll has a resilient cover, it will yieldingly cushion the die holder 26 and the die 27 to force the die through the web to cut a blank without injuring the die during the cutting stroke.

A continuous limp web W, which when the cutter is cutting auto mats is formed of a sheet of unvulcanized rubber supplied by a calender (not shown), is fed from a conveyor 30 over rollers 31, and 32 to the lower pressure roll of the blank cutter. Because in this invention the flexibility of a limp web is utilized to form a festoon in the uncut web in front of the machine during the retracting stroke of the die, and because the festooning portion of the web is much heavier than the cut portion of the web, means are provided to prevent the unthreading of the machine by the festooning portion of the web. In the embodiment shown in the drawings, this means comprises an auxiliary pinch roll 33 which is mounted on the movable lift plates 18, through means described below, and positioned to bear against the driven pressure roll 16. As best shown in Figs. 1 and 5, the pinch roll 33 is fixed on a shaft 34 which is journaled in end plates 35, and the plates 35 in turn are fixed to the shaft 36 which is journaled in the lift plates 18. Since both the lower pressure roll 16 and the pinch roll 33 are fixed to the lift plates 18, they will remain in juxtaposition when the lower roll 16 is in both its raised and lowered position. The pinch roll 33 is urged against the lower pressure roll by weights 39 on the ends of cords 40. These cords are trained over pulleys 41 fixed to the beam frame 13 and tied to a pinch brake arm 38 and a pinch motor arm 37 which are fixed to the plates 35 at opposite ends of the pinch roll. This pinch roll 33 is urged continuously against the lower pressure roll 16; hence the web W is held threaded between the lower pressure roll 16 and the auxiliary pinch roll 33 at all times. As will be pointed out hereinafter, this pinch roll may also help advance the web W through the cutter, and to this end, it is provided with means to synchronize its rotation with the rotation of the lower pressure roll 16 so that the web W is advanced or held stationary when the lower pressure roll 16 is rotated or held stationary. To cut a blank, the carriage and die are positioned as shown in Fig. 3, and the plates 18 are raised to position the lower pressure roll and web as shown in Fig. 1. The upper pressure roll then is rotated in a clockwise direction as seen in Fig. 1 to advance the die through the rolls, and the lower pressure and pinch roll are rotated to advance the web W through the rolls in conjunction with the die. When a blank has been severed from the web, the rotation of the rolls is stopped, the lower pressure roll 16 and pinch roll 33 are lowered, and the rotation of the roll 15 is reversed to retract the die carriage and die through the rolls. When the die has been retracted, the lower pressure roll and pinch roll are again raised to the position shown in Fig. 1, and the cycle is repeated.

The power to operate the cutter is supplied from the main drive air cylinder 43 which drives a rack 44 meshing with a gear 45. The driving pressure roll is actuated from the rack 44 through the gear 45, the stub shaft 46, the gear 47 and the gear 48 fixed to the shaft 29. The driven pressure roll is rotated from the driving pressure roll shaft 29 through the gear train which is shown on the right of the cutter in Fig. 2.

Figure 6:
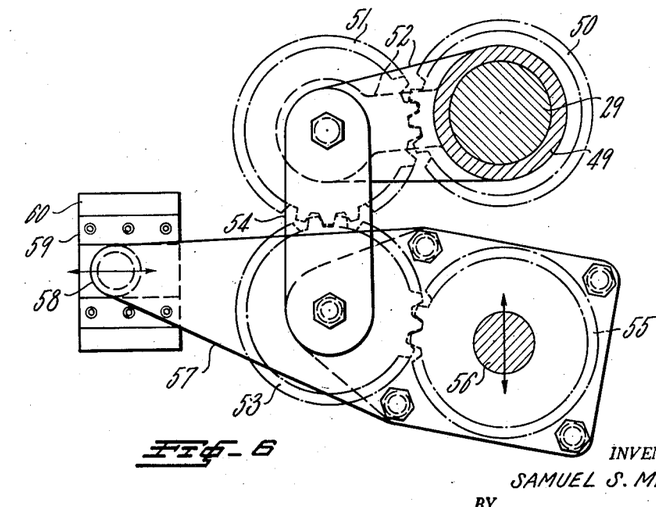
Fig. 6 is a side view of the gear cluster which drivingly connects the driving and driven pressure rolls.

Referring now to Figs. 2 and 6, this gear train comprises a sleeve 49 rotatable on the shaft 29 and carrying a gear 50. Meshing with this gear 50 is an idler gear 51 supported by the straps 52 which serve to keep the gears 50 and 51 in mesh. The idler gear 51 meshes with a second idler gear 53 which is held in mesh therewith by the straps 54. The idler gear 53 in turn meshes with a gear 55 fixed to the shaft 56 of the driven pressure rolls 16. The gears 53 and 55 are held in mesh by a pair of straps, the front strap 57 of which has an elongated triangular flange carrying a cam follower 58 that rides in a horizontal grooved track in a block 59. This block is fixed to a base 60 on the side frame 10. In the gear train, the cam follower 58 is constrained to move in a horizontal direction along its grooved track. The shaft 56 and its gear 55 are constrained to move in a vertical direction only by the lift plates 18. By so controlling the movements of the gear 55 and the strap 57, the gear 53 will be limited in its movement to a predetermined path for it is supported by the strap 57, and by suitably selecting the size of the gears 50, 51, 53 and 55, the gear 51 can be made to roll around the gears 50 and 53 without transmitting any rotational motion to the gear 55 when the shaft 56 is raised or lowered. In this manner the driving and driven pressure rolls are coupled continuously, yet the gear 55, and hence the driven roll 16, is not rotated to unthread the web W from the apparatus when the driving and driven pressure rolls are separated.

Inasmuch as the driving pressure roll 15 is rotated in a reverse direction when the die is retracted, means are provided in the gear train to prevent the transmission of this rotational motion to the driven pressure rolls to unthread the web from the cutter. In the embodiment of the invention shown in the drawings, this means takes the form of an overrunning sprag clutch 61 interposed between the sleeve 49 and the shaft 29 which is arranged to transmit to the shaft 56 the clockwise but not the counter-clockwise rotation of the shaft 29 as seen in Fig. 1. The sprag clutch construction is well known and consists of a housing which defines an annular race about the shaft 29. This race is filled with a series of spring activated sprags having a substantially elliptical cross-section. The sprags are arranged in the race to permit the shaft 29 to rotate freely in the housing in a counter-clockwise direction, but the sprags jam between the shaft 29 and the race to drive the sleeve 49 when the shaft 29 is rotated in a clockwise direction. By these means the driven pressure roll 16 is made to rotate only when the driving pressure roll is rotating in a direction to cut a blank from the web, and the roll 16 is rendered motionless at all other times. Inasmuch as the pinch roll 33 is coordinated in its rotation with that of the driven pressure roll 16 as will be pointed out hereinafter, the web W is advanced through the pressure rolls only during a cutting stroke, and is held threaded against the lower pressure roll at all times.

Referring now to Fig. 2, the power for raising and lowering the plates 18, and hence the pressure roll 16 and the pinch roll 33, is supplied from the air operated lifting cylinder 62. The piston in this cylinder drives a rod 63 fixed to the lifting arms 64 which are fixed on the shafts 65. The shafts 65 rotate in bearings 66 mounted on brackets 67 on the frames 10 and 11. The arms 64 are connected on their outer ends to yokes 68 which are fixed to the lift plate 18 by pins 69 near the bottom of an elliptical opening in the lift plates. To limit the downward movement of the lower pressure roll and pinch roll, a cross piece 70 is fixed to the frame of the cutter by means of bolts 71 in a position to stop the upward movement of the inner ends of the arms 64; and to cushion the drop of these rolls, the arms 64 are provided with shock absorbers 72. It will be apparent that when the piston in the cylinder 62 is actuated in a downward direction, the driven pressure roll will be raised to cutting position, and when this piston is not actuated, the driven pressure roll will drop to the position permitted by the crosspiece 70.

The operation of the machine which is shown in the drawing is controlled primarily by a seven way air valve 73 which may be supported conveniently from a control panel 74. The other controls on the cutter are adapted primarily to move the pistons within this valve to supply air to and exhaust air from the pneumatic cylinders which power the various elements of the machine in precisely the proper sequence. The cutter may be operated manually by manipulating valve 73, but in order to permit practical operation, supplemental controls are supplied to actuate this main control valve.

Figures 7, 8:
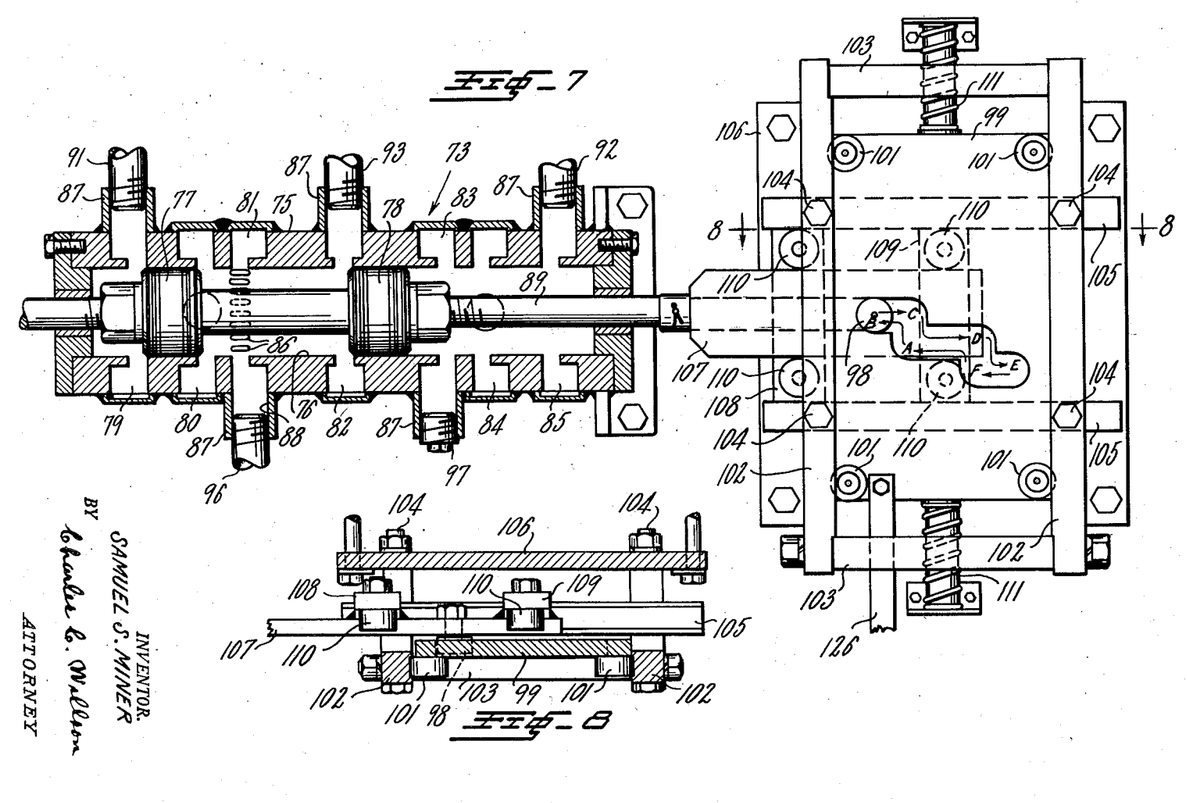
Fig. 7 is a cross-sectional view of the main control valve, and of the cam plate which regulates the operation of this valve.
Fig. 8 is a cross-sectional view of the cam plate along the line 8—8 of Fig. 7.

Valve 73 consists of a large cylinder 75 having a relatively thick wall and a smooth bore 76 adapted to receive pistons 77 and 78. Referring now to Fig. 7, the cylinder wall has a series of seven external annular grooves or ports 79 to 85 of square cross section, each of which is open to the interior of the cylinder through a series of elliptically shaped openings 86 which are spaced equally about the circumference of the bore 76. Each of the ports is enclosed in an eccentric sleeve 87 which is fixed to the outside of the cylinder 75 as by welding. Sleeve 87 is made from a disk slightly thicker than the width of the ports and of greater diameter than cylinders 75. This disk has an eccentric hole therethrough of a size such that the disk fits the outside diameter of the cylinder 75; and it has its interior hollowed out so that the thickness of the outer wall is constant, but when it is assembled on the cylinder 75, the distance from the internal wall of the disk 87 to the cylinder 75 progressively increases around the cylinder 75. In this manner the effective depth of the air space in ports 79—85 varies from a minimum at one side of the cylinder to a maximum at a diametrically opposed point of the port. Each of the sleeves 87 has a threaded opening 88 at the point where the effective depth of the port is greatest, and pipes are connected from these openings to the air supply, cylinders 43 and 62, and atmosphere. Air admitted to any of the ports will accumulate in larger volume closer to the outlet of the eccentric sleeve 87, so that the greater volume is immediately adjacent the outlet and the smaller volume is at a point diametrically opposite the outlet. This construction facilitates rapid transfer of the air from the valve 73 and thus speeds up the action of the controls.

Cylinder 75 is equipped with two pistons 77 and 78 fixedly spaced from one another on piston rod 89 which is connected at its ends to a tongue 107 and a piston in cylinder 100. The location of the ringed pistons 77 and 78 with respect to ports 79 to 85 in the cylinder 75 determines the elements of the controls to which compressed air is directed. The ports 79 and 85 exhaust to atmosphere through pipes 91 and 92 respectively, and port 82 is connected to the main air supply line 113 through pipe 93. Ports 80 and 84 are connected to the opposite ends of the main drive cylinder 43 through the pipes 94 and 95 respectively. Port 81 is connected to the upper end of the lift cylinder 62 by a pipe 96, and port 83 is closed by means of a plug 97. As will become apparent hereinafter, when the lower pressure roll 16 is sufficiently heavy to cause lowering thereof by means of gravity there is no need to provide an air drive to the bottom of the cylinder 62; however, the port 83 is positioned such that if it be desired to lower the driven pressure roll by means of compressed air, a pipe may be connected from the port 83 to the bottom of the cylinder 62.

The position of the pistons 77 and 78 within the cylinder 75 is determined by the position of a cam follower 98 riding in a cut out cam in a cam plate 99. This cam plate 99 is constrained to move only vertically in a frame by rollers 101 mounted on the face of the cam plate near its corners which track in the vertical tracks 102. The vertical tracks 102 are spaced by the spacing members 103 and are fixed to the horizontal tracks 105 and the supporting panel 106 by means of bolts 104. The tongue 107 which carries the cam follower 98 is positioned behind the cam plate 99 and has fixed thereto the roller supports 108 and 109 which carry the rollers 110 guided in the tracks 105. In this manner the rotatable cam follower 98 which extends into the opening in the cam plate 99 is constrained to move only in a horizontal direction by the rollers 110 tracking in the tracks 105. In order that the cam follower 98 may move about the cam in the cam plate 99 and thus shift the pistons 77 and 78, the movements of the cam plate 99 and the actuation of the cylinder 100 must be coordinated, and the manner in which these elements are actuated will determine the operating cycle of the valve 73 and hence the blank cutter. It will be noted that cam plate 99 is centered between two springs 111. These springs are disposed in such a manner that when the cylinder 125 is inactive, the cam plate is urged vertically into its central position, so that the cam follower 98 may occupy the positions designated A or D in Fig. 7.

Since the construction of certain of the control apparatus of the cutter of this invention may be described more conveniently when their functions are described, their description will be deferred until their operation is stated in the following description of the operation of the blank cutter.

*Operation*

For convenience in describing the operation of the blank cutter, its cycle of operation may be considered in terms of phases which are determined by the possible positions of the cam follower 98 that are marked A, B, C, D, E and F in Fig. 7 of the drawing, but it should be understood that the blank cutter of this invention operates in a continuous cycle and that this cycle is completed rapidly.

Figure 12:
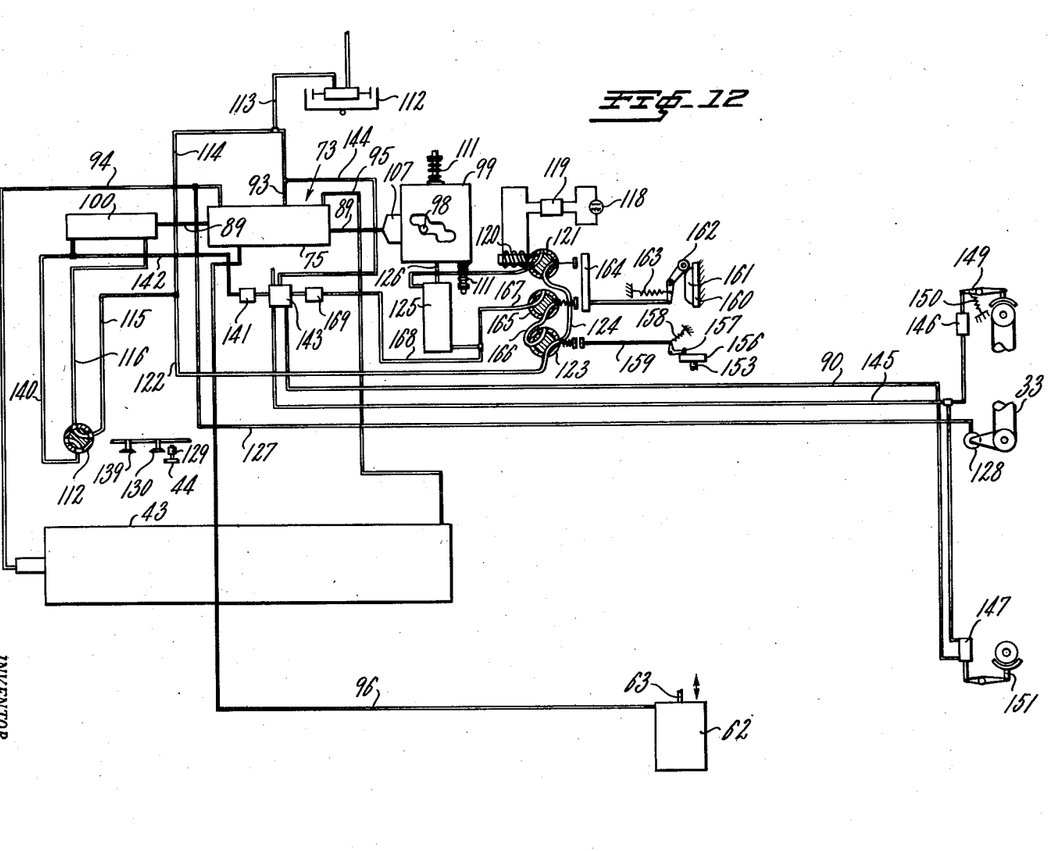
Fig. 12 is a schematic view of the controls for automatically operating the blank cutter.

With the cam follower 98 adjusted to the position A, the operation of the apparatus may be commenced by opening the air supply valve 112. Referring to Figs. 7 and 12, when the cam follower 98 is in position A, the pistons 77 and 78 are positioned so that the ports 81 and 82 communicate through the control valve 73. Ports 80 and 83 are covered by the pistons 77 and 78 respectively. In this position air pressure is admitted to the upper end of cylinder 62 by means of the pipe 96, and the arms 64 lift the lower pressure roll 16 to the cutting position. The right end of the main drive cylinder 43 is exhausted to atmosphere through the ports 84 and 85, and the left end of this main drive cylinder which has been exhausted previously to atmosphere is at atmospheric pressure. Air pressure is supplied to the right end of the valve control cylinder 100 from the main air supply line 113 through the line 114, line 115, valve 112 (which is in the position shown in Fig. 12) and the line 116. Thus the cam follower 98 is urged to the left but is restrained by the convolutions of the cam slot in the cam plate 99.

The cutting cycle is initiated when web W festoons sufficiently in front of the cutter to interrupt a beam of a light from a source 117 focused on a photo-electric cell 118. When this light beam is interrupted, a current is caused to flow from an amplifier 119 to a solenoid 120 which shifts a balanced valve 121 a quarter turn in a clockwise direction from the position shown in Fig. 12. When the valve 121 is shifted, air pressure is supplied from line 113 through line 114, line 122, the valve 123, the line 124 and valve 121 to the upper end of the cylinder 125 to urge the cam plate 99 downwardly by means of the connecting link 126. When cam plate 99 is lowered, cam follower 98 is permitted to move under the urging of cylinder 100 to position B to shift pistons 77 and 78 in control valve 73 to the position shown in Fig. 7.

In position B, air pressure is supplied from the port 82 to raising cylinder 62 through pipe 96 to raise the lower pressure roll, and air pressure is supplied to the left end of the main drive cylinder 43 through pipe 94 to drive rack 44 to advance the upper and lower pressure rolls and the die carriage as heretofore explained. Simultaneously with the admission of air pressure to the left end of cylinder 43 air pressure is admitted by means of a pipe 127 connected to the pipe 94 to a small air motor 128 which drives the pinch roll 33 by means of a chain and sprocket.

Referring to Figs. 1 and 3 this drive motor 128 is secured to the drive motor lifting arm 37 adjacent the pinch roll 33. Since the lower pressure roll 16 and the pinch roll 33 are rotating in unison, the web W will be advanced through the pressure rolls to cut a blank therefrom as heretofore described.

Referring now to Figs. 1 and 10, as rack 44 continues its driving stroke a cam follower 129 strikes a cam 130 to shift it and to rock the rod 131 to which this cam is fixed. When the rod 131 is rocked, the yoke 132 fixed thereto is rocked, and the roller 133 on this yoke actuates the button 134 to shift the valve 112. To hold the valve 112 in its shifted position until controls shift it back, the yoke 132 is held by a pressure plate 135 which is urged toward the yoke by a spring 136 that surrounds rod 131 and is compressed between plates 137 and 135. A rubber disk 138 lies between the plate 135 and the yoke as a friction member to help hold the yoke in its shifted position. The cams 130 and 139 are fixed to the rod 131 in such a manner that when the cam follower 129 strikes either of the cams, it shifts this cam out of the path of travel of the follower and shifts the other cam into position to be struck by the follower 129.

Referring again to Fig. 12, when follower 129 strikes cam 130 it shifts valve 112 a quarter turn in the clockwise direction, and air pressure is admitted to the left end of the cylinder 100 from the air supply through the pipes 113, 114, 115, valve 112 and line 140, and the right end of the cylinder 100 is exhausted to atmosphere through line 116 and valve 112. The reversal of the air in cylinder 100 shifts the cam follower 98 from the position B to the position C.

In position C the pistons 77 and 78 in valve 73 occupy the same positions which they occupy in position A. Thus the driving air pressure is closed off from the left end of cylinder 43 and from pinch drive motor 128, and air pressure is active in cylinder 62 to hold the lower pinch roll raised to cutting position. Simultaneously with the reversal of air pressure in cylinder 100 air pressure is admitted through the pipes 140 and 142 to a valve shifting cylinder 141 which controls the position of a valve 143. The valve 143 is shifted by the cylinder 141 to a position to admit air from the main air supply through pipe 113, pipe 144 and valve 143 to the pipe 145 and cylinders 146 and 147 to brake the pinch and pressure rolls.

Referring now to Fig. 11 the pinch roll brake is shown as a spring actuated brake band 148 which is controlled by an elliptical plate on a brake arm 149. When air pressure in cylinder 146 is applied to raise the plunger, the brake arm 149 is rotated about pivot 149-A against the action of the spring 150 to apply the brake band to the pinch roll. As shown in Fig. 2 the pressure roll brake 151 is applied to the sleeve 49. When this brake, which may be similar to the brake on the pinch roll, is applied to the sleeve 49, the upper pressure roll is braked through the clutch, and the lower pressure roll is braked through the gear train. It will be observed that in this manner the pinch roll is braked simultaneously with the lower pressure roll 16, and that it is driven when the lower pressure roll is driven. Although under certain operating conditions the pinch drive and brake may not be needed, these elements are found desirable in the efficient operation of the cutter on rubber sheet stock, for this stock is supplied in a soapy condition to the cutter. If the brake and drive are not connected to the pinch roll, excessive waste occurs between blanks and imperfect blanks are cut, for the pinch roll drags the stock when a stroke is starting and drives the stock when the stroke is ending.

To shift valve 73 to its next position, means are provided to actuate cam plate 99 when the travel of the die carriage through the pressure rolls is stopped. This means is shown specifically in Fig. 9 to comprise a sprocket 152 on the upper pressure roll shaft 29 which drives a small threaded shaft 153 through a similar sprocket 154 and chain 155. When the shaft 29 stops abruptly upon the application of the brake 151, a fly wheel 156 on the shaft 153 continues to rotate, and spins itself across a coarsely threaded shaft 153. This fly wheel 156 comprises an inner wheel and an outer shell rotatable on this inner wheel, and when the fly wheel has moved the length of the shaft a lug on the inner wheel strikes a cooperating lug on a disk fixed to the shaft to stop the rotation of the inner wheel. To prevent the fly wheel 156 from reversing its rotation and rebounding along the shaft 153 when it is stopped abruptly in this manner, the outer shell of the fly wheel continues to rotate about the inner wheel. As the fly wheel 156 moves along the shaft 153 it strikes the lever 157 and moves it laterally. It will be noted that when reverse rotation of the shaft 29 is abruptly stopped the fly wheel 156 will be moved in a similar manner to its first position to permit the spring 158 to reposition the lever 157.

Referring again to Fig. 12, when the fly wheel 156 moves the lever 157, a rod 159 actuates the spring biased valve 123 to shift the valve 123 a quarter turn in the clockwise direction. When valve 123 is thus shifted, the upper end of cylinder 125 is exhausted to atmosphere through valve 121, pipe 124 and valve 123. Since cylinder 125 no longer has any effect on cam plate 99, the springs 111 move the plate 99 so that cam follower 98 occupies the position A, but since the air pressure has been reversed in cylinder 100, cam follower 98 is immediately shifted to position D.

In position D pistons 77 and 78 are moved to exhaust ports 80 and 81 to atmosphere through port 79 and to admit air pressure to port 83. When port 81 is exhausted, cylinder 62 is exhausted through line 96, and lower pressure roll 16 drops. If the weight of the lower pressure roll is not sufficiently great to drop this roll with the speed desired, this roll may be lowered by air pressure as heretofore explained.

Referring now to Figs. 1 and 2, when the lower pressure roll is dropped a rod 160 which is fixed to lift plate 18 is lowered, and a cam 161 thereon is lowered out of engagement with a cam follower 162. When the cam 161 and the cam follower 162 are disengaged, the spring 163 is effective to move the shoe 164 to the left as seen in Fig. 12 to turn the valves 121 and 165. The shoe 164 returns valve 121 to the position shown in Fig. 12, and turns the spring biased valve 165 a quarter turn in the clockwise direction from the position shown in Fig. 12. With valve 121 in the position shown, and the valves 165 and 123 thus turned a quarter turn, air pressure is admitted through pipes 113 and 114, valve 123, pipe 166, valve 165, and pipe 167 to the lower end of cylinder 125. Cam plate 99 thus is shifted upwardly and cam follower 98 under the urging of cylinder 100 is shifted to position E. At the same time air pressure is admitted from pipe 167 to the pipe 168 and the cylinder 169. Since air pressure remains in the cylinder 141, valve 143 is balanced and air pressure remains in brake cylinders 146 and 147 to hold the brakes on, but since pressure is in cylinder 169 the brakes will be released when cylinder 141 is exhausted.

In position E air pressure is admitted from the main air supply 113 through ports 82 and 84 to pipe 95 and thus to the right end of the main drive cylinder 43. Since the left end of this cylinder is exhausted to atmosphere, the drive will be reversed and the rack 44 will return to reposition the die carriage 21 and die. During the retracting stroke of the rack 44 the came follower 129 will strike the cam 139 to reposition the valve 112 and cam 130 as explained. When this valve is repositioned the left end of the cylinder 100 will be exhausted to atmosphere and the right end of the cylinder will be pressurized to shift cam follower 98 to position F. Simultaneously cylinder 141 will be exhausted to atmosphere to permit the piston 169 to shift valve 143 to exhaust pipe 145 and pressurize pipe 90, so that spring 150 removes the pinch roll brake and cylinder 147 removes the brake on sleeve 49.

When the cam follower is shifted to position F the piston 78 will cover the port 84 and the main drive cylinder 43 will continue to drive the driving roll 15 under the force of the expanding air trapped in the main drive cylinder. As the die carriage continues its retracting stroke cams 170 on racks 22 are contacted by the rollers 171 of shock absorbers 172 to stop the reverse travel of the carriage. When the rotation of the driving pressure roll 15 is thus stopped abruptly by the shock absorbers, fly wheel 156 will be moved as previously described to permit the spring biased valve 123 to reshift to the position shown in Fig. 12. In this position with the valve 165 held turned by the shoe 164, the lower end of the cylinder 125 is exhausted to atmosphere through pipe 167, valve 165, pipe 166 and valve 123. Simultaneously the cylinder 169 is similarly exhausted to atmosphere. When the lower end of cylinder 125 is exhausted the cam plate 99 is shifted, under influence of the springs 111 and cam follower 98 under the urging of air pressure in the cylinder 100 is shifted to position A. In this position as previously described the lower pressure roll is again raised to move the shoe 164 from the spring biased valve 165 so that the valves 121, 165 and 166 again occupy the position shown in Fig. 12 and the cutter is ready to start a new cycle of operation when the web W interrupts the light beam from the source 117. Since the web W has been supplied continuously from the conveyor 30, this web has been accumulating in a festoon between rollers 31, 32 before the cutter during the reversing stroke, and the cutter is immediately ready to cut a new blank from the web. In actual operation the carriage reciprocates continuously and the supply of webbing to the cutter may be coordinated with its movements so that there is little time lag in the operation of the apparatus.

In addition to the functions which have already been ascribed to them, certain of the elements of the machine have a significance in improving the operation of the cutter which may not be readily apparent when their individual functions are considered. Thus the small fly wheel 156 which controls the raising and lowering of the lower pressure roll and thus prepares the machine for the die strokes, is significant in that it operates unfailingly, for it is responsive only to a change in speed of the upper pressure roll. Therefore this control will be actuated regardless of where the die stops at the end of a stroke. This is important, for the effectiveness of the means to stop the carriage may vary with operating conditions, so that if, for example, a switch which is responsive to the length of stroke of the die carriage were provided, it might not always be actuated, for this stroke may vary with operating conditions. However when the fly wheel is provided, the operation of the blank cutter is not halted in the middle of a cycle. Should it be found that operating conditions have so affected the apparatus as to cause it to turn out imperfect blanks, it is only necessary to adjust the length of the stroke by moving the cam follower 130 without interrupting the operation of the machine.

Furthermore, the provision of a means such as the shoe 164 to reposition and hold the valve 121 until the lower pressure roll is in the cutting position assures that the solenoid 120 shall not be active to start a new cycle of operation until the lower pressure roll and the die carriage are in a position to cut a blank from the web. Conversely, this means assures that as soon as the lower pressure roll is in cutting position the solenoid 120 may initiate a cutting cycle, provided only that sufficient webbing has accumulated before the cutter to provide a blank.

A safety feature is provided in the form of shock absorbers 173 at the delivery end of the cutter. These shock absorbers are not normally actuated by the racks 22 during the blank cutting operation but are provided to stop the die carriage should the brakes on the driving roll fail to operate.

To receive the cut blanks and the web scrap a conveyor 174 is provided beneath the driven pressure roll at the delivery side of the apparatus. This belt may be placed sufficiently beneath the driven pressure rolls 16 so as not to interfere with the vertical movement of this roll, or it may be spaced laterally somewhat from this pressure roll and be provided with means such as the strip plate 175 to convey the cut out blank and the webbing scrap to the conveyor 174 as shown in the drawings. The movement of the conveyor 174 is coordinated with the operation of the blank cutter in such a manner that during the retracting stroke it conveys the cut out blank away from the cutter at a relatively low speed to a position where it may be removed from the belt by a workman, but travels at the much greater linear speed of the cutting rolls when a blank is being cut, so that the blank is not crumpled as it is deposited on the conveyor 174. This belt may be driven at the lower speed by an independent motor and at the higher speed by the cutter through an over-running clutch which could be conveniently a sprag type clutch such as that previously described.

It will be seen from the foregoing that the blank cutting machine of the present invention is adapted to cut blanks from a sheet W as it is advanced from calender rolls, and that by using the rubber covered roll 15 to force the profile die 27 against the stock, as the die and stock pass between the rolls 15 and 16, the blanks are cut from the sheet W in a highly satisfactory manner.

Having thus described my invention, what I claim and desire to protect by Letters Patent is:

1. A machine for cutting blanks, comprising a pair of spaced pressure rolls, means adjacent a first of said rolls for holding a web thereagainst, a reciprocating cutting die, means to advance the web and die between the pressure rolls to cut a blank from the web as the die and web are advanced through said pressure rolls, driving means to rotate said pressure rolls when said die and web are advanced therethrough, means to retract the die between said rolls, and means to render said driving means inoperatable to drive said first pressure roll and to render motionless the web, said first pressure roll and said holding means during retraction of said die.

2. A machine for cutting blanks from a continuously advancing web, comprising a pair of vertically spaced pressure rolls, a pinch roll to hold the web against the lower pressure roll, a cutting die, means to advance the die and web between said pressure rolls simultaneously, means to separate said pressure rolls, means responsive to a decrease in speed of the die during its advance operable to actuate said means to separate said pressure rolls, means to retract the die between said rolls, means to render motionless the lower pressure roll, the pinch roll and the portion of the web therebetween during retraction of the die, means to reposition said pressure roll, and means responsive to a decrease in speed of the die during its retracting stroke operable to actuate said means to reposition said pressure rolls.

3. A machine for cutting blanks from a continuously advancing web, comprising a pair of vertically spaced pressure rolls, a pinch roll adjacent the lower pressure roll cooperating therewith to hold the web against the lower pressure roll at all times, a cutting die, means responsive to an accumulation of the web before the machine and operable to advance the web and die through the operatble to drive said first pressure roll and to render to retract the die through the rolls, and means to render motionless the web and lower pressure roll during retraction of the die.

4. A machine for continually cutting blanks from an advancing web, comprising a pair of vertically spaced pressure rolls, means for holding the web against the lower pressure roll, a cutting die, means responsive to a predetermined accumulation of web before said rolls and operable to advance the web and die between said rolls, means to retract the die between said rolls, means to lower said lower pressure roll for the retracting stroke of the die, means to render motionless the web and lower pressure roll during retraction of the die, and means to render ineffective said means to advance the die while said lower pressure roll is lowered.

5. A machine for cutting blanks from a web, comprising a pair of spaced pressure rolls, a gear on a first of said pressure rolls, a rack in continuous mesh with said gear, means cooperating with the second of said pressure rolls to hold the web thereagainst at all times, a cutting die moveable with said rack, means for rotating said pressure rolls to advance the web and die between said pressure rolls, means for reversing the rotation of said first roll to retract the die, and means to separate said rolls and render motionless the lower pressure roll during retraction of the die.

6. A machine for cutting blanks from a continuously advancing web, comprising a pair of spaced pressure rolls, a pinch roll for holding the web against a first of said pressure rolls, a cutting die, means to advance the die and web between the pressure rolls, means responsive to the distance the die is advanced between said rolls to brake the die, means to separate said pressure rolls and to retract the die, and means to render motionless said first pressure rolls, the web and said pinch roll during the retraction of said die.

7. A machine for cutting blanks from a continuously advancing web, comprising a pair of spaced pressure rolls, a pinch roll for holding the web against a first of said pressure rolls, means responsive to accumulation of the web before the machine to advance the die and web between said rolls to cut a blank from the web, means responsive to the length of advance of the die to brake said pressure and pinch rolls and the die, means responsive to a decrease in speed of the advancing die to separate said pressure rolls and retract the die, means to render motionless said first pressure roll and the pinch roll during retraction of the die, means responsive to the separation of said pressure rolls to render said means responsive to accumulation of the web before the machine ineffective during separation of said pressure rolls, and means responsive to a decrease of speed of the die during retraction to reposition said pressure rolls.

8. A machine for cutting blanks from a web, comprising a pair of spaced pressure rolls, means adjacent a first of said rolls for holding the web against said first roll, a cutting die, means to advance the die and web between said pressure rolls to cut a blank from the web as the die and web are advanced through said pressure rolls, driving means to rotate both said pressure rolls when said die and web are advanced therethrough, means to separate said pressure rolls, means to retract the die between said pressure rolls, and means to render said driving means inoperable to drive said first pressure roll and to render motionless said first pressure roll and the portion of the web held thereagainst during the retracting stroke of the die.

9. A machine for cutting blanks from a continuously advancing web, comprising a pair of vertically spaced pressure rolls, a pinch roll adjacent the lower of said pressure rolls to hold the web thereagainst, a cutting die, means to rotate said pressure rolls and to advance the die and the web between the rolls to cut a blank from the web, means to separate said pressure rolls, means to retract the die between said pressure rolls, means to render motionless said lower pressure roll during retraction of the die, and means responsive to an accumulation of the web before the machine to actuate said means to advance the die and web through the pressure rolls.

10. A machine for cutting blanks from a continuously advancing web, comprising a pair of vertically spaced pressure rolls, a pinch roll adjacent the lower of said pressure rolls to hold the web against said lower pressure roll, means to advance the die and web through said pressure rolls to cut a blank from the web, means responsive to a decrease in speed of the die during said advance to separate said pressure rolls, means to retract the die through the pressure rolls, means to render motionless the web, said lower pressure roll and the pinch roll during retraction of the die, and means responsive to a decrease in speed of the die during its retracting stroke to reposition said pressure rolls.

11. A machine for cutting blanks from a web, comprising a first pressure roll having a resilient cover, a second pressure roll having an inelastic surface adjacent but spaced from said first pressure roll, a pinch roll adjacent said second pressure roll adapted to hold the web thereagainst, a cutting die, means to advance the die and web between the pressure rolls to cut a blank from the web, means to retract the die, and means to render motionless the web, the second pressure roll and the pinch roll during retraction of the die.

12. A machine for cutting blanks from a web, comprising a pair of vertically spaced pressure rolls, a pinch roll adjacent the lower of said pressure rolls for holding the web against said lower roll, a cutting die, means on the upper pressure roll to move the die with said upper roll, means to rotate said upper roll to advance the die between the pressure rolls to cut a blank from the web, a gear train drivingly connecting the lower pressure roll and the upper pressure roll having the gears in said train constantly in mesh, said gear train being constructed and arranged such that vertical movement of said pressure rolls does not rotate the rolls, a one-way driving clutch between said pressure rolls cooperating with said gear train to drive said lower pressure roll only when the upper pressure roll is driven to advance the die whereby the web is advanced with the die during the cutting stroke but is held stationary during the retracting stroke, means for separating said upper and lower pressure rolls, and means for reversing the direction of rotation of said upper pressure roll to retract the die.

13. In a blank cutter, a pair of spaced pressure rolls, means adjacent a first of said rolls adapted to hold a web against said roll, a die, means for advancing the die and web between the pressure rolls to cut a blank from the web as the die and web are advanced between said pressure rolls, driving means to rotate both said pressure rolls when said die and web are advanced therethrough, means to receive said blank and carry it away from said pressure rolls, means for separating said pressure rolls, means for retracting said die, and means to render said driving means inoperable to drive said first pressure roll and to render motionless said first pressure roll and the web during retraction of said die.

14. A machine for cutting blanks from a continuously advancing web, comprising a pair of vertically spaced pressure rolls, a pinch roll for holding the web against the lower of said pressure rolls, a cutting die, means for driving the die from a first of said pressure rolls, means for driving said pressure rolls to advance the die and web between the rolls to cut a blank from the web, brakes responsive to the distance which said die has advanced to stop the rotation of said pressure rolls and said pinch roll means for separating said pressure rolls, means to reverse said first pressure roll to retract said die, and means to render motionless said lower pressure roll and said pinch roll and the portion of the web therebetween during retraction of the die.

15. A machine for cutting blanks from a continuously advancing web, comprising a pair of vertically spaced pressure rolls, a pinch roll for holding the web against the lower of said pressure rolls, a cutting die, means for driving said pressure rolls and the die, and means for driving said pinch roll, whereby the die and web may be advanced in unison between the pressure rolls to cut a blank from the web, means for lowering said lower pressure roll, means for retracting the die, and means to render said lower pressure roll, said pinch roll and the web motionless during retraction of the die.

References Cited in the file of this patent

UNITED STATES PATENTS

| | | |
|---|---|---|
| 2,127,820 | Kindelberger | Aug. 23, 1938 |
| 2,164,806 | Eickman | July 4, 1939 |
| 2,168,401 | Evers | Aug. 8, 1939 |
| 2,549,202 | Idelman | Apr. 17, 1951 |

FOREIGN PATENTS

| | | |
|---|---|---|
| 455,831 | Canada | Apr. 12, 1949 |